Dec. 8, 1970    M. M. SCHWARTZ    3,545,124
TOY
Filed Dec. 3, 1968    2 Sheets-Sheet 1
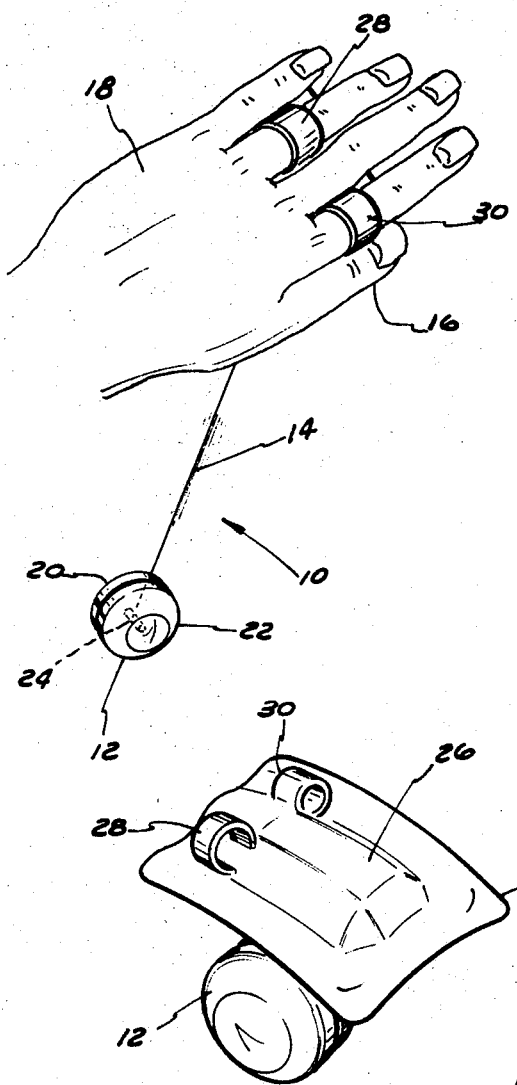
FIG·1
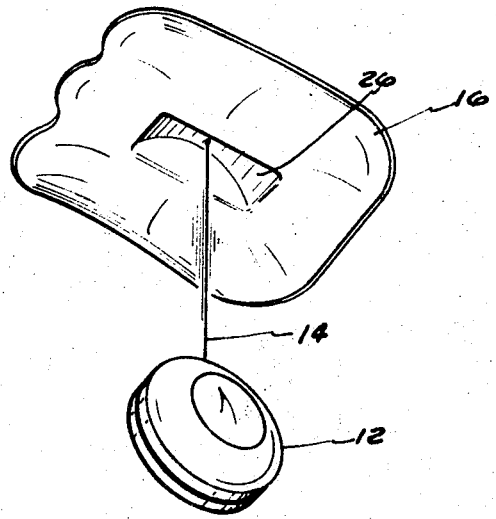
FIG·2
FIG·3
FIG·4
INVENTOR
MARIUS M. SCHWARTZ
BY
Hauke Knass Gifford Patalidis
Attorneys Dec. 8, 1970       M. M. SCHWARTZ       3,545,124
TOY
Filed Dec. 3, 1968       2 Sheets-Sheet 2
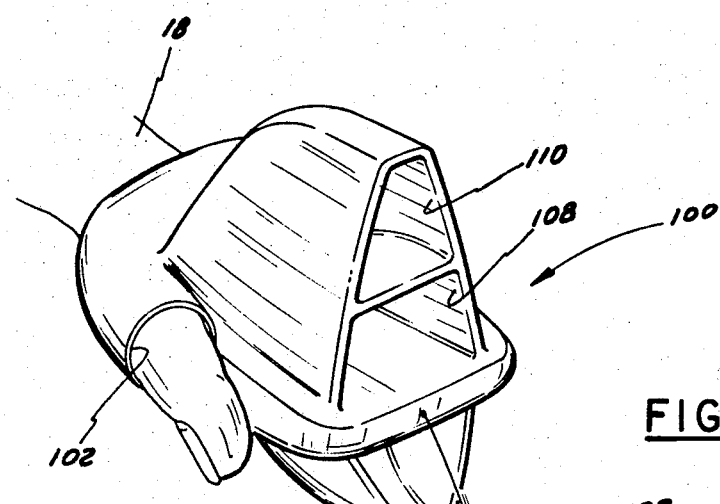
FIG·5
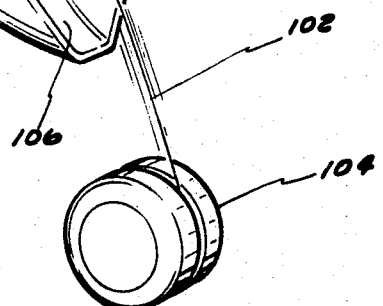
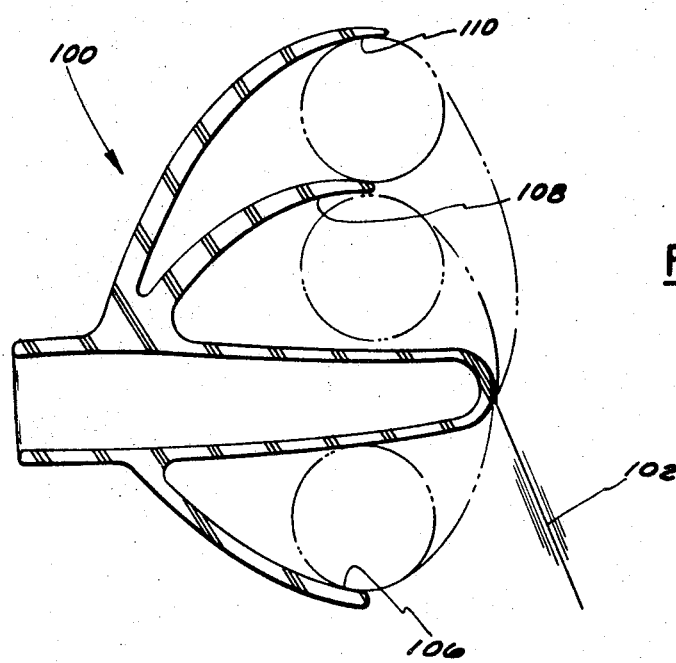
FIG·6
INVENTOR
MARIUS M. SCHWARTZ
BY
*Hauke Knox Gifford & Patalides*
Attorneys

United States Patent Office 3,545,124
Patented Dec. 8, 1970

3,545,124
TOY
Marius M. Schwartz, 27155 Fairfax,
Southfield, Mich. 48075
Filed Dec. 3, 1968, Ser. No. 780,669
Int. Cl. A63h 27/12
U.S. Cl. 46—61          7 Claims

ABSTRACT OF THE DISCLOSURE

A Yo-Yo with a handle that is attached to the operator's hand, and has a flexible socket for receiving the spool as it is wound on the cord.

BACKGROUND OF THE INVENTION

This invention relates to string-operated toys, and more specifically to a handle that is connected to the string of such a toy, is attached to the operator's hand and has a socket for catching the spool as it is manipulated by the cord.

String-operated toys such as Yo-Yos normally comprise a cord having a spool on one end and a loop on its other end that encircles the operator's finger. By manipulating his hand, the operator can cause the spool to spin up and down the cord.

The problem with the conventional manner for connecting the cord to the operator's finger is that the spool's manipulation is often limited because it is not positively captured by the operator's fingers. The cord's connection to a finger causes the spool to return toward the fingers in such a manner that it is difficult to catch because of its spin, and when caught the grip on the spool is inadequate for manipulating the spool in certain movements.

SUMMARY OF THE INVENTION

The broad purpose of the present invention is to provide a handle for a Yo-Yo type toy that is securely attached to the operator's hand, and has a pocket or flexible socket for receiving the spool as it is wound on the cord. In one embodiment, the handle can be attached to the hand, with the socket disposed adjacent either the palm or the back of the hand. When disposed in his palm, the operator can flex the socket to either positively receive the spool into, or release the spool from the socket.

In another embodiment, the handle is formed in the shape of a glove with sockets integrally formed on both the palm side and the back side of the glove to allow the operator to catch the spool in alternative positions with respect to his hand.

The spool can be more effectively manipulated with the preferred handle because it assists the fingers in capturing the spool by reducing any tendency of the spool to spin from the operator's grip. In addition, the operator can achieve a greater control over the spool's motion because it is released from a central portion of his hand. This improved control allows the operator to manipulate the spool into a broader variety of skillful motions.

Still further advantages of the present invention will become readily apparent to those skilled in the art to which the invention pertains upon reference to the following detailed description.

DESCRIPTION OF THE DRAWINGS

The description refers to the accompanying drawing in which like reference characters refer to like parts throughout the several views, and in which:

FIG. 1 is a perspective view showing the string operated toy illustrating the preferred embodiment of the invention with a socket for receiving the spool positioned in the operator's palm;

FIG. 2 is a view of the toy of FIG. 1 showing the opening of the socket;

FIG. 3 is a view showing the handle separated from the operator's hand;

FIG. 4 is a perspective view showing the handle mounted with the socket adjacent the back of the operator's hand;

FIG. 5 is a perspective view showing another form of the invention in which the sockets are formed on both upper and lower sides of a handle in the shape of a glove; and FIG. 6 is a sectional view through the embodiment of FIG. 5.

DESCRIPTION OF THE PREFERRED EMBODIMENT

Now referring to the drawing, a preferred toy embodying the invention is illustrated at 10, and comprises a spool 12 connected to one end of a flexible string or cord 14. A handle 16, connected to the other end of the cord 14, is shown secured to the hand 18 of an operator. The spool is formed of a pair of disc-shaped ends 20 and 22 joined together at their centers by a spindle 24.

The cord 14 is connected to the spindle 24 such that the spool can be alternately wound on and unwound from the cord as it is spun about the axis of the spindle. The combination of the cord 14 and the spool 12 form the basic elements of a string-operated toy commonly known as a Yo-Yo.

The handle 16 is formed of a relatively flat piece of flexible material, and has a breadth approximately the size of the operator's hand. A socket 26, integrally formed in the central portion of the handle 16, opens to one side of the hand and is shaped to receive a major portion of the spool 12.

A pair of rings 28 and 30, carried on the backside of the handle 16, are formed to receive a pair of the operator's fingers in order to position the socket either adjacent the operator's palm, as illustrated in FIG. 1, or the back of his hand as illustrated in FIG. 4. In either position, the socket is adjacent the central portion of the operator's hand 18. The rings 28 and 30 provide means for positively securing the handle 16 to the operator's hand.

When mounted as illustrated in FIG. 1, the operator can flex the back of the socket to grip the spool 12 as it spins into the handle. In order to insure that the spool will approach the socket 26 as it is wound on the cord 14, the end of the cord is attached to the center of the socket.

Thus it is to be understood that I have described an improved string-operated toy in which the cord 14 is securely connected to the operator's hand, guides the spool toward a central position in the operator's hand, and provides means for manipulating the spool into controlled motions as it is released. The preferred handle can be attached with the socket adjacent either side of the hand. When the socket is disposed in the operator's palm, he can positively grip the spool 12 and avoid slippage by flexing the socket and skillfully manipulate the spool in a greater variety of movements than are ordinarily possible when the cord is connected directly to his finger.

Another embodiment of the invention, illustrated in FIG. 5, shows a handle in the form of a glove 100 which covers the major portion of the user's hand 18. Preferably the glove is formed of an integral piece of flexible material, and has a thumb opening 102 along a lateral side that allows the user's thumb to securely retain the glove on his hand. A core 102, connected to the end of the glove 100, is attached to the spool 104 which is similar to the spool 12 of the embodiment of FIGS. 1 to 4 in that it can be alternately wound and unwound on the cord 102 in controlled motions.

The glove has three sockets 106, 108 and 110, each of which is formed to receive the spool 104, and to allow the operator to release it in a controlled spinnnig motion. The socket 106 is formed on the palm side of the glove 100, the sockets 108 and 110 are formed on the back side of the glove. It is to be noted that sockets 108 and 110 are stacked one above the other so that the spool can be caught in and released from alternative positions adjacent the back of his hand.

It is to be noted that in the form of the invention illustrated in FIGS. 5 and 6, the spool 104 allows the operator to catch the Yo-Yo in at least three alternative position with respect to his hand as opposed to the embodiment of FIG. 1 with which he can catch the spool in only one position depending upon whether the socket is mounted on the palm side or the back side of his hand. Thus the glove 100 increases the control the operator has over the motion of the spool and therefore increases the variety of motions that can be executed.

Having described my invention, I claim:

1. A manually operated toy, comprising: a length of cord; a spool attached to one end of the cord, the spool being operable to be alternately wound and unwound from the cord; a handle having means for removably securing same to the hand of an operator, and a flexible socket formed in said handle and adapted to receive the spool; and means connecting the other end of the cord to the socket such that by manipulation of the operator's hand, the spool is moved into and out of the socket as it is, respectively, wound and unwound from the cord.

2. A toy as defined in claim 1, in which the means for securing the handle to the operator's hand comprises a ring for receiving the operator's finger.

3. A toy as defined in claim 2, in which the ring is attached to the handle such that the socket can be disposed adjacent either the operator's palm, or the back of his hand for manipulation of the spool.

4. A toy as defined in claim 1, in which the socket is so formed that it can be flexed by the operator's hand to either retain or release the spool as it is, respectively, spun into and out of the socket.

5. A toy as defined in claim 1, in which the means for securing the handle to the operator's hand comprises the handle being formed in the shape of a glove for gracing at least a portion of his hand.

6. A toy as defined in claim 1, in which the handle has a second socket and is adapted to be secured to the operator's hand in such a manner that one socket is adjacent the palm of his hand and the other socket is adjacent the back of his hand.

7. A manually operated toy, comprising: a length of cord; a spool attached to one end of the cord, the spool being formed to be alternately wound onto and unwound from the cord by a manipulation of the cord; a handle connected to the other end of the cord, the handle having a socket formed of flexible material shaped to receive and to release the spool as the spool is, respectively, wound on and unwound from the cord; and means for detachably securing the handle to an operator's hand such that the socket is positioned adjacent either the palm or the back of the hand for manipulation of the spool on the cord.

References Cited

UNITED STATES PATENTS

| 59,745 | 11/1866 | Haven et al. | 46—61 |
| 1,864,318 | 6/1932 | Powell | 46—61 |
| 2,773,328 | 12/1956 | Fraenkel et al. | 46—61 |
| 3,037,321 | 6/1962 | Thomason | 46—61 |
| 3,382,609 | 5/1968 | Neanhouse | 46—61 |

FOREIGN PATENTS 22,401  8/1904  Great Britain.

LOUIS G. MANCENE, Primary Examiner

D. L. WEINHOLD, Assistant Examiner